United States Patent
Williams et al.

[19]

[11] Patent Number: 5,968,178
[45] Date of Patent: Oct. 19, 1999

[54] CIRCUIT AND METHOD FOR RESETTING A MICROCONTROLLER

[75] Inventors: Timothy J. Williams, Bellevue; Warren S. Snyder, Snohomish, both of Wash.

[73] Assignee: Cypress Semiconductor Corp., San Jose, Calif.

[21] Appl. No.: 08/963,843

[22] Filed: Nov. 4, 1997

[51] Int. Cl.$^6$ .................................................... G06F 1/24
[52] U.S. Cl. ............................................ 713/340; 327/143
[58] Field of Search .................................. 327/142, 143; 713/300, 340; 395/750.01, 750.08

[56] References Cited

U.S. PATENT DOCUMENTS

| | | |
|---|---|---|
| 3,833,888 | 9/1974 | Stafford et al. . |
| 4,038,533 | 7/1977 | Dummermuth et al. ........... 235/151.11 |
| 4,042,972 | 8/1977 | Gruner et al. . |
| 4,511,968 | 4/1985 | Fencsik et al. . |
| 5,159,217 | 10/1992 | Mortensen et al. ....................... 307/597 |
| 5,203,000 | 4/1993 | Folkes et al. ............................. 713/340 |
| 5,323,006 | 6/1994 | Feddeler et al. .......................... 327/142 |
| 5,454,114 | 9/1995 | Yach et al. . |
| 5,606,511 | 2/1997 | Yach ........................................ 364/483 |
| 5,675,813 | 10/1997 | Holmdahl . |
| 5,778,738 | 7/1998 | Hofline .................................... 713/340 |

FOREIGN PATENT DOCUMENTS 9736230 10/1997 WIPO .

OTHER PUBLICATIONS

Universal Serial Bus Microcontroller CY7C63101/CY7C63100, Oct. 1996, pp. 1–3.

Universal Serial Bus Microcontroller CY7C63000/CY7C63001/CY7C63200/CY7C63201, Mar. 4, 1997, pp. 1–24.

Universal Serial Bus Microcontroller CY7C63001, CY7C63000, Oct. 1996, pp. 1–3.

*Primary Examiner*—Glenn A. Auve
*Attorney, Agent, or Firm*—Christopher P. Maiorana, P.C.

[57] ABSTRACT

A first circuit configured to present a first indication signal in response to a predetermined level of an input voltage and a second circuit configured to enter a suspend mode in response to the first indication signal. In one example, the second circuit may enter an active mode in response to a second indication signal received from an external device. In another example, the second circuit may be implemented as a microcontroller.

12 Claims, 3 Drawing Sheets

CIRCUIT AND METHOD FOR RESETTING A MICROCONTROLLER

FIELD OF THE INVENTION

The present invention relates to microcontrollers generally and, more particularly, to a circuit and method for resetting a microcontroller.

BACKGROUND OF THE INVENTION

One conventional approach to resetting a microcontroller requires external or internal precision devices to provide a reset into a particular power-on mode. Another conventional approach uses internal timers to keep a microcontroller in the reset condition for a fixed amount of time after a low-voltage condition occurs. Both of theses approaches attempt to bring the microcontroller into a known running condition after the reset occurs.

Referring to FIG. 1, a circuit 10 illustrating a conventional approach for resetting a microcontroller is shown. The circuit 10 generally includes a power supply 12 and an integrated circuit 14. The integrated circuit 14 includes a low voltage detector 16, a hold-off timer 18 and a microcontroller 20. The low voltage detector 16 has an input 22 that receives a voltage from the power supply 12. The low voltage detector 16 responds to a voltage at the input 22 exceeding a predetermined threshold by presenting a signal at an output 24. The signal at the output 24 is presented to an input 26 of the hold-off timer 18 as well as to an input 28 (i.e., a Reset input) of the microcontroller 20. The hold-off timer 18 presents a signal (i.e., Operate) at an output 30 that is presented at an input 32 (i.e., a Run input) of the microcontroller 20. With such a configuration, the low voltage detector 16 is implemented as a precision voltage detector that may be either internal or external to the integrated circuit 14. A precision voltage detector may be required to determine when the voltage at the power supply 12 reaches a level sufficient for the proper operation of the integrated circuit 14.

The main disadvantage with the circuit 10 is that it is difficult to reset the microcontroller 20 into a known running condition while the voltage at the power supply 12 is low. It may also be difficult to keep the microcontroller 20 properly operating in a known condition while the voltage received at the power supply 12 continues to transition to the final and specified operating range after exceeding the predetermined turn on voltage. As a result, the microcontroller 20 must be able to operate at a sufficiently low voltage to allow the reset circuitry (i.e., the low voltage detector 16 and the hold-off timer 18) to operate properly. To provide proper functioning of the microcontroller 20, the hold-off timer 18 may be required to present a hold-off time that may be incompatible (i.e., too long) with overall system power-up/response time requirements.

SUMMARY OF THE INVENTION

The present invention concerns a first circuit configured to present a first indication signal in response to a predetermined level of an input voltage and a second circuit configured to enter a suspend mode in response to the first indication signal. In one example, the second circuit may enter an active mode in response to a second indication signal received from an external device. In another example, the second circuit may be implemented as a microcontroller.

The objects, features and advantages of the present invention include providing a circuit and method for resetting a microcontroller into a suspend mode (e.g., a suspended state) after a reset condition occurs. The suspend mode may (i) allow the microcontroller to properly function during a transition from a reset voltage to a final operating voltage, (ii) eliminate a case where the microcontroller may not function properly due to a low voltage condition and (iii) provide a margin of error sufficient in the supply voltage to allow proper functioning of the microcontroller. The present invention may also (i) eliminate the need for a precision low-voltage detector, (ii) eliminate the necessity for the microcontroller to operate at low voltages, (iii) simplify the design demands on the microcontroller, (iv) eliminate constraints that occur during the use of a power-up time-out circuit, (v) allow a robustly and inexpensively engineered chip to start at a known state after power-up, (vi) tolerate both the fastest practical power supply ramping rates as well as the slowest practical power supply ramping rates and (vii) eliminate the condition of providing a specific limit on the amount of time for the power supply to ramp to a predetermined power supply operating voltage.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention concerns a circuit and method for resetting a microcontroller into a suspend mode (e.g., a suspended state). The suspend mode may deactivate the non-essential functions of the microcontroller. Non-essential functions may include functions that may not be immediately needed. The microcontroller may then transition from the suspended state into a normal operating mode in response to an external input. By first transitioning into the suspend mode, the requirement for the microcontroller to function properly during the transition from the reset voltage to the final operating voltage may be eliminated. Since the microcontroller generally only needs to remain in the suspend mode during the transition to a normal operating voltage, the overall design complexity of the microcontroller may be reduced.

Microcontrollers used in applications such as communication systems may take advantage of an external signal to begin operation. One such example is the Universal Serial Bus (USB) used in personal computers where the operation of an attached peripheral device may not be required until the host computer initiates communication. By initially entering into a suspend mode, a reduced power consumption may result prior to the host computer initiating communication.

Figure 2:
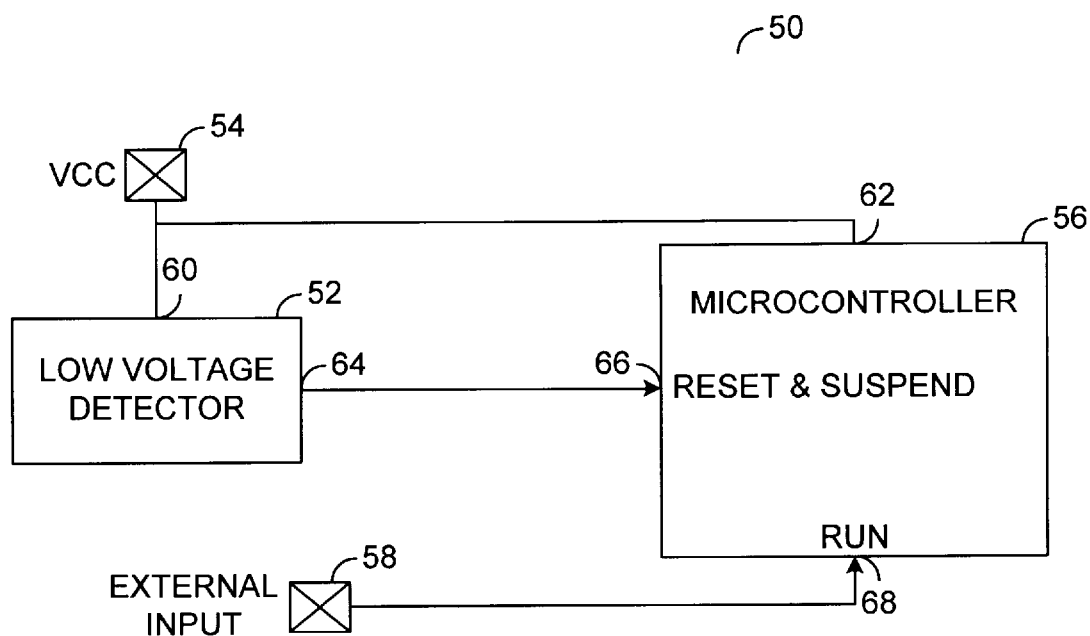
FIG. 2 is a block diagram of a preferred embodiment of the present invention.

Referring to FIG. 2, a block diagram of a circuit 50 is shown in accordance with a preferred embodiment of the present invention. The circuit 50 generally comprises a low voltage detector block (or circuit) 52, an input power supply pin 54, a microcontroller 56 and an external input pin 58. The input power supply pin 54 may receive an input power supply voltage (e.g., VCC) that may be presented to an input 60 of the low voltage detector circuit 52 as well as to an input 62 of the microcontroller 56. The low voltage detector circuit 52 comprises an output 64 that may present a signal (e.g., an indication signal) to an input 66 of the microcontroller 56. The low voltage detector circuit 52 generally detects when the voltage present at the input power supply reaches a predetermined voltage level and then may present the indication signal to the microcontroller 56. The external input pin 58 may present a signal (e.g., a second indication signal) to an input 68 of the microcontroller 56. After the first indication signal is received at the input 66, the microcontroller 56 may enter into a suspend mode and then generally waits for the second indication signal to be received from the external input 58 which may indicate the microcontroller 56 should enter a run mode.

Figure 1:
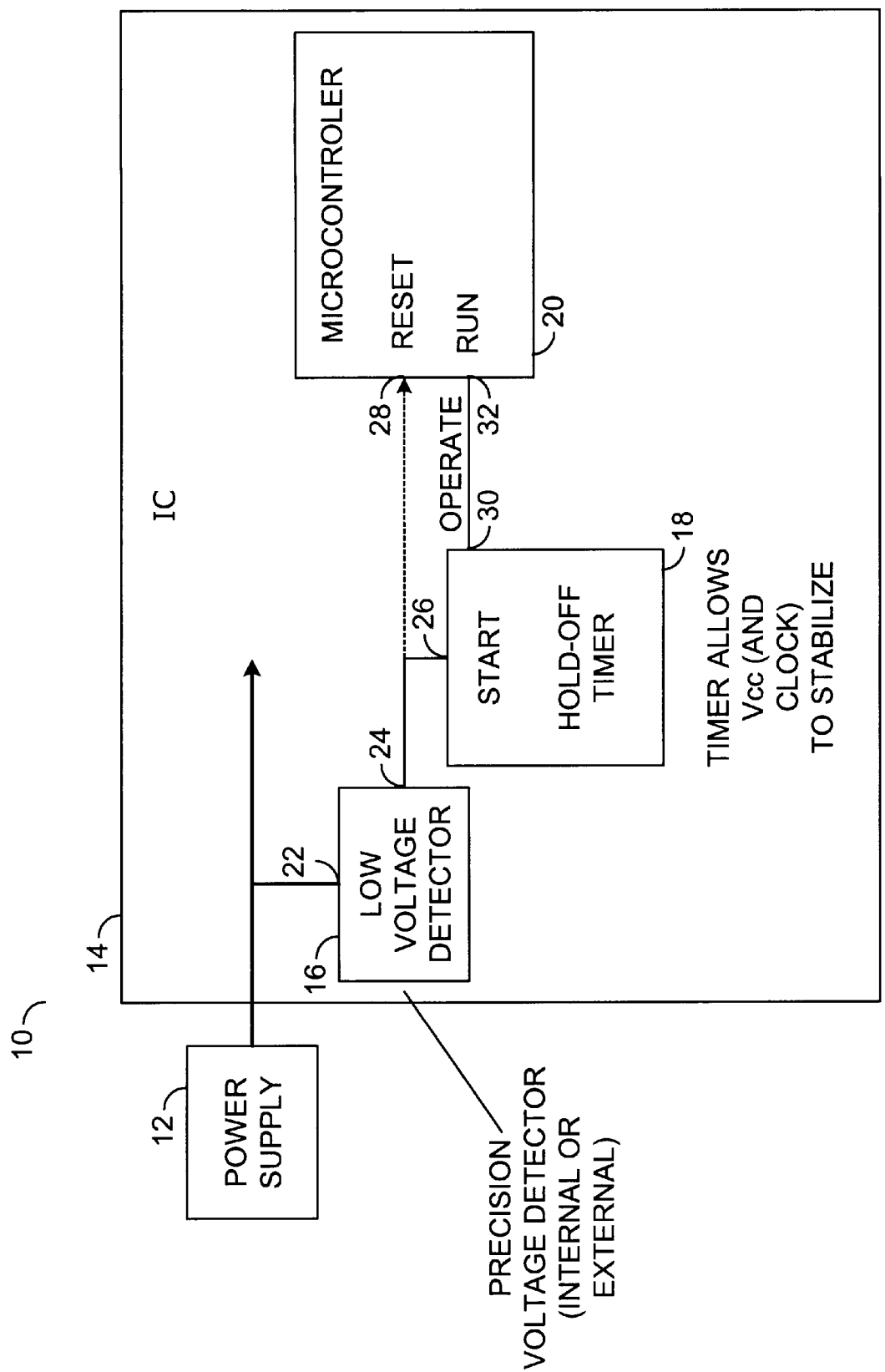
FIG. 1 is a block diagram of a conventional reset circuit.

The circuit 50 may avoid a state where the microcontroller 56 must power up in a running state and/or be guaranteed to operate whenever a reset condition has been removed. Since the initial state may be the suspend mode, the microcontroller 56 may function properly with extremely low power supply voltages that may occur during the ramp up of the input power supply voltage. The circuit 50 may also avoid the precise detection of a low-voltage followed by the implementation of one or more hold-off timers as discussed in connection with FIG. 1.

Certain design constraints (as discussed in the background section) may be implemented, such as a system specified to operate at 4V and above, with the microcontroller 20 designed to operate at voltages above 3.5 V to guarantee operation within a predefined margin over a variety of operating conditions. In such a scenario, the reset signal must remain asserted whenever the supply voltage is at or below 3.5 V to ensure proper functioning of the microcontroller 20. In addition, the reset signal must also be removed before the supply voltage reaches the specified limit (i.e., 4 V). Otherwise, the reset will interfere with normal operation of the microcontroller 20. Achieving a reset circuit that meets these conditions may be difficult in typical digital integrated circuit processes. In some case, a precision external or internal component may be used to provide the low-voltage reset function, with associated cost, space, and power penalties.

The circuit 50 may eliminate such precision components and constraints by implementing an inexpensive low-voltage control circuit that may provide a less precise, but acceptable, response. For example, the low voltage detector circuit 52 may be designed to present the first indication signal when the power supply is below a threshold that varies between 1.5 V and 3.5 V. In this case, the suspend mode may not interfere with normal operation of the microcontroller (e.g., 4 V). During power-up, however, the suspend mode may be de-asserted while the power supply 54 is ramping up from 0 V to 1.7 V, and then may be asserted for power supply voltages between 1.7 V and any voltage up to 4 V. While the voltage between 1.7 V and 4 V may be too low for guaranteed proper operation of the microcontroller 56, it may be adequate for the suspend mode of the microcontroller 56. The implementation of the microcontroller 56 having such a suspend mode may result in cost, space, and power savings. The threshold of the detector circuit 52 may be adjusted accordingly to meet the design criteria of a particular application.

In addition to the cost, space and power savings of the circuit 50, an expanded implementation may result. For example, not all systems can tolerate the timer delay approach discussed in connection with FIG. 1. For example, in a Universal Serial Bus (USB) system (such as devices compliant with the USB Specification Version 1.0 published Jan. 15, 1996, the relevant sections of which are hereby incorporated by reference), devices may be "hot-plugged" into an already powered port on a host computer. In such a case, the power to the device may ramp and be stable at the device within a few microseconds, with signaling occurring within a few milliseconds. However, if the device is already plugged into the computer when power is applied to the computer, it may take as many as 100 ms to 1000 ms for the power supply to ramp to its final operating voltage. In this case, a single time-out time that can work for both extremes (i.e., long enough for proper functioning, yet short enough to allow signaling within the device specification) may not be practical or possible.

Devices may not require running immediately after power-up such as in the USB system for personal computers. After attachment of a USB peripheral device to a USB host computer, or with the power-up of an already attached device, the USB device generally waits for signaling from the host prior to the beginning of normal operation. In general, the USB communication begins with the second indication signal from the host to the USB device. The second indication signal may be presented in response to a Single Ended Zero (SEO) that persists for longer than 8 $\mu$s. The USB device may only need to be in a known state (e.g., the suspend mode) after a Power On Reset (POR), and be ready to receive the second indication signal to begin operation. In this case, a USB device (such as the circuit 50 of FIG. 3) that powers up into the suspend mode may accomplish this readiness for both fast or slow ramping voltage supplies. The second indication signal may place the USB device into a running mode, after which proper operation may result. In one example, the running mode may be functional in 256 $\mu$s. However, other start up times may be designed accordingly.

Figure 3:
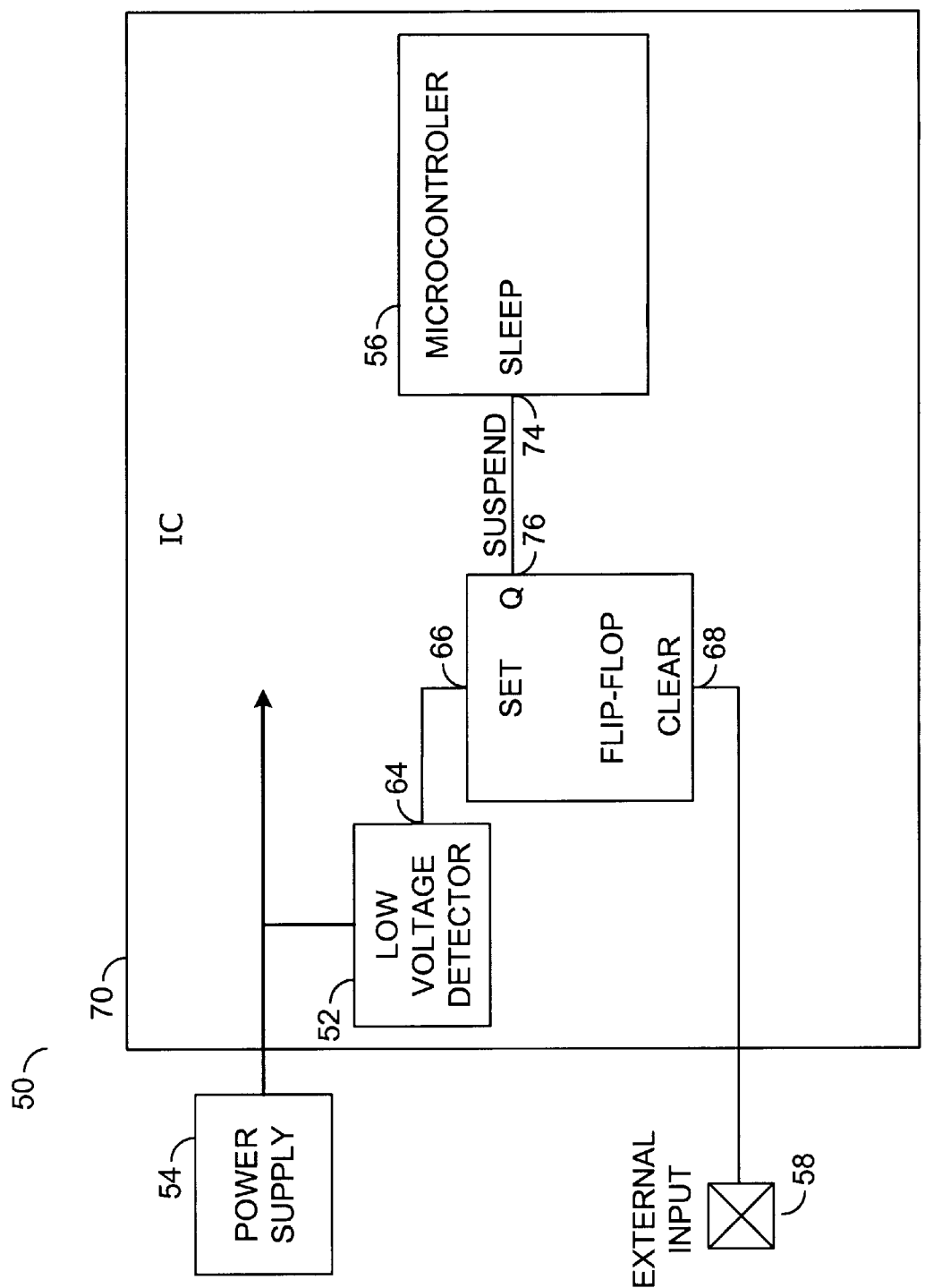
FIG. 3 is a more detailed block diagram of a preferred embodiment the present invention.

Referring to FIG. 3, a more detailed diagram of the circuit 50 is shown. The circuit 50 may include an integrated circuit 70. The integrated circuit 70 generally includes the low voltage detector 52 and the microcontroller 56. The integrated circuit 70 further includes a memory element 72. The memory element 72 is shown generally implemented as a Q flip-flop. The memory element 72 may receive the first signal from the low voltage detector 52 at the input 66 and may receive the second indication signal from the external input pin 58 at the input 68. The memory element 72 may present a control signal at the output 76 that is at one state when the first indication signal is present at the input 66 is at a second state when the second indication signal is present at the input 68. The microcontroller 56 generally includes an input 74 that may receive the control signal from the output 76 of the memory element 72. During the initial ramp up of the power supply voltage, the memory element 72 may present the first state of the control signal that may indicate the microcontroller 56 should operate in the suspend mode. After receiving the second indication signal at the external input 58, the memory element 72 may preset the second state that may cause the microcontroller 56 to transition into the active mode. By implementing the memory element 72, a single input 74 may allow the microcontroller 56 to toggle between the suspend mode and the active mode.

Figure 4:
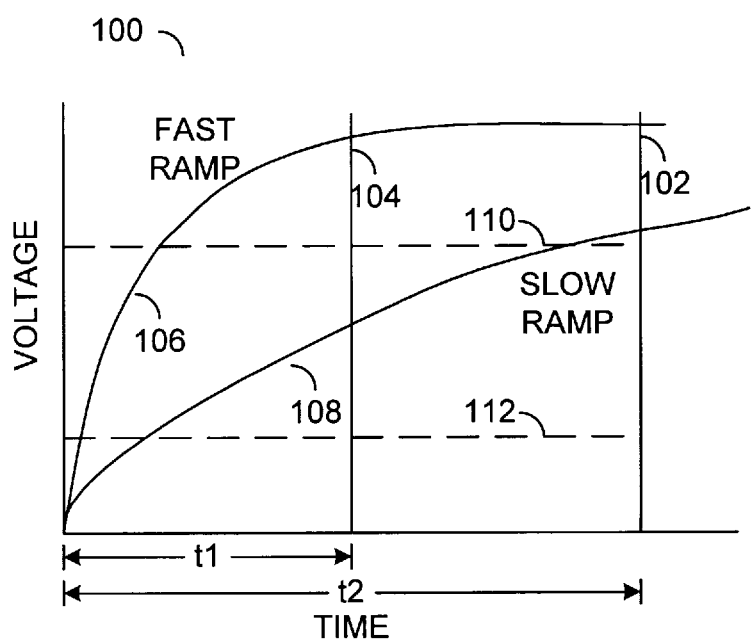
FIG. 4 is a graph of various power supply ramp up rates.

Referring to FIG. 4, a diagram 100 illustrating various input voltage waveforms is shown. The diagram 100 generally comprises a vertical line 102, a vertical line 104, a waveform 106 and a waveform 108. The waveform 106 generally represents a fast ramping input power supply voltage. The waveform 108 generally comprises a slow ramping input power supply voltage. The vertical line 104 is shown generally at a time t1 while the vertical line 102 is shown generally at a time t2. A threshold voltage 110 is shown which may represent a minimum voltage necessary to provide proper operation of a device such as the microcontroller 50. When the threshold voltage 110 represents the minimum voltage, the slow ramping waveform 108 does not pass the threshold voltage 110 at the time t1, but does pass the threshold voltage 110 at the time t2. In contrast, the waveform 110 passes the threshold voltage 110 prior to the time t1. The circuit 50 may be designed such that the low voltage detector circuit 52 presents a signal after the input voltage reaches the voltage 112. With such a design constraint, either the fast ramping waveform 106 or the slow ramping waveform 108 will provide proper operation of the circuit.

While the invention has been particularly shown and described with reference to the preferred embodiments thereof, it will be understood by those skilled in the art that various changes in form and details may be made without departing from the spirit and scope of the invention.

We claim:

1. A circuit comprising:
   a first circuit configured to present a first indication signal in response to a predetermined level of an input voltage; and
   a microcontroller configured to enter (i) a suspend mode in response to said first indication signal or (ii) an active mode in response to a second indication signal received from an external device.

2. The circuit according to claim 1, wherein said first circuit comprises a low voltage detector circuit.

3. The circuit according to claim 1, further comprising a third circuit configured to present a control signal to said first circuit in response to said first and second indication signals, said first control signal being at (i) a first state when said first indication signal is present and (ii) a second state when said second indication signal is present.

4. The circuit according to claim 3, wherein said third circuit comprises a memory circuit.

5. The circuit according to claim 4, wherein said memory circuit comprises a flip-flop.

6. The circuit according to claim 1, wherein said input voltage comprises an input supply voltage.

7. A Universal Serial Bus (USB) device comprising the circuit of claim 1.

8. A circuit comprising:
   a first circuit configured to generate a first indication signal in response to a power up level of an input supply voltage;
   a second circuit configured to enter a suspend mode in response to said first indication signal; and
   a third circuit configured to cause said second circuit to enter an active mode in response to a second indication signal received from an external device.

9. The circuit according to claim 8, wherein said power up level comprises an initial level of said input supply voltage.

10. A method for powering up a microcontroller, comprising the steps of:
    presenting a first indication signal to said microcontroller in response to a predetermined level of an input voltage;
    suspending non-essential functions in said microcontroller in response to said first indication signal; and
    activating said non-essential functions in said microcontroller in response to a second indication signal received from an external device.

11. The method according to claim 10, further comprising the step of:
    generating a control signal having (i) a first state when said first indication signal is present and (ii) a second state when said second indication signal is present.

12. The method according to claim 10, wherein said external device comprises a Universal Serial Bus (USB) device.

* * * * *